United States Patent Office 2,839,896
Patented June 24, 1958

2,839,896
COMBINED HYDRAULIC AND MECHANICAL CONTROL APPARATUS

Erich Koch, Berlin-Charlottenburg, Germany, assignor to Jung Schleifmaschinen H. Gaub, Berlin-Tempelhof, Germany Application February 15, 1955, Serial No. 488,272

Claims priority, application Germany February 22, 1954

19 Claims. (Cl. 60—52)

The present invention relates to a control apparatus.

More particularly, the present invention relates to a control apparatus for controlling a hydraulic moving means, such as a piston and cylinder, which is adapted to move in a very precise manner any desired member such as, for example, a carriage of a machine tool.

Although control apparatus for accomplishing this purpose are known, the known apparatus have several disadvantages. Thus, the known apparatus are usually composed of relatively bulky units made up of parts which cannot be separated from each other by any substantial distance so that such a known apparatus presents great difficulty where space is at a minimum. Furthermore, the known control apparatus are usually completely hydraulic so that precision in the control is difficult to obtain where the pressure of the hydraulic fluid cannot be accurately regulated.

One of the objects of the present invention is to overcome the above drawbacks by providing a control apparatus which is capable of operating with great precision even where fluid pressure varies.

Another object of the present invention is to provide a control apparatus which is partly hydraulic and partly mechanical so that advantage may be taken of the mechanical part of the apparatus to guarantee precision in the operation thereof.

A further object of the present invention is to provide a control apparatus which may be easily and conveniently adjusted to carry out different cycles of operation.

An additional object of the present invention is to provide a control apparatus which is capable of automatically moving a given member rapidly during one part of its movement and slowly during another part of its movement.

Also, it is an object of the present invention to provide an apparatus capable of accomplishing all of the above objects and at the same time being made up of simple and ruggedly constructed parts which are very reliable in operation.

With the above objects in view, the present invention mainly consists of a control apparatus which includes a hydraulic moving means for moving a given member and a multi-way valve hydraulically connected to the hydraulic moving means for controlling the flow of fluid to and from the same. A hydraulic motor is hydraulically connected to the valve and to the hydraulic moving means, and a mechanical control means is operatively connected to the valve for operating the same and to the hydraulic motor to be operated thereby.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
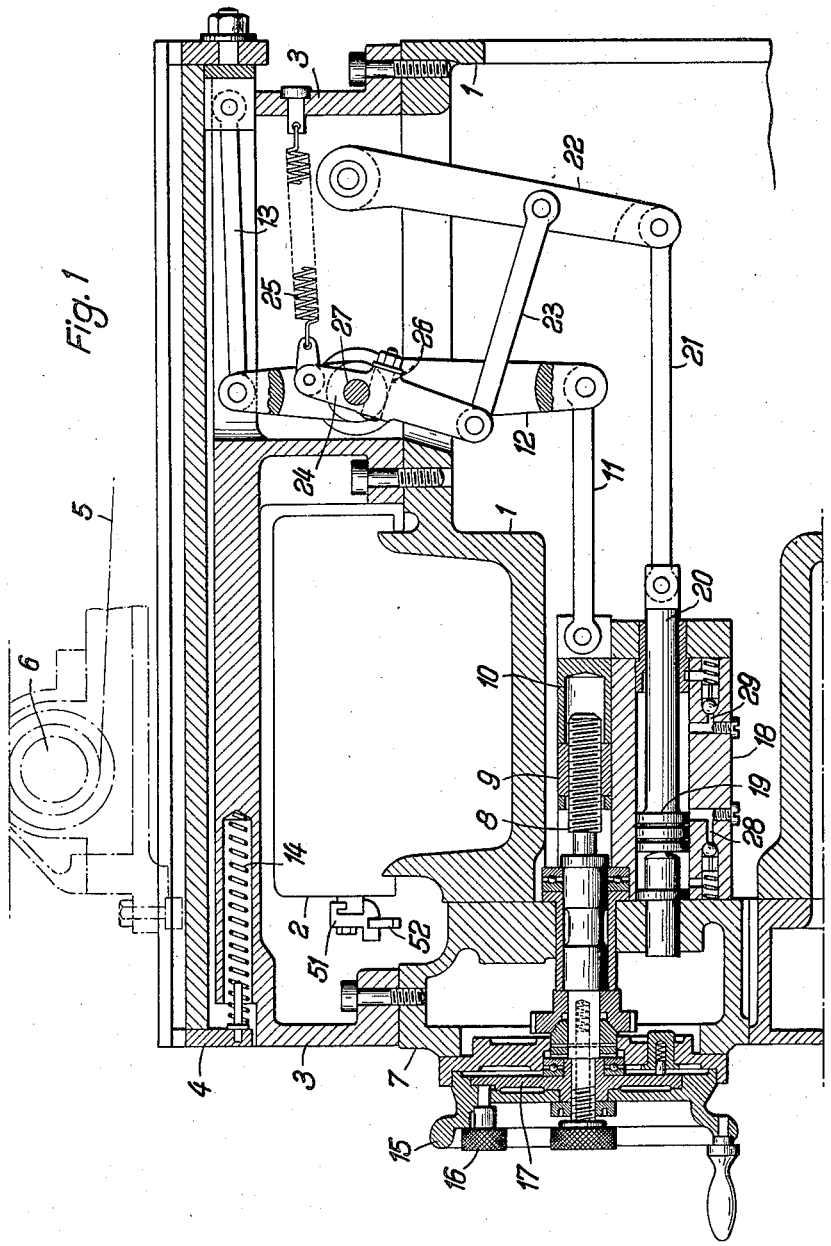
Fig. 1 is a partly diagrammatic, fragmentary, partly sectional illustration of a machine adapted to be operated in part by the control apparatus of the invention.

Referring now to the drawings, it is pointed out that the control apparatus of the invention is of general utility and that Fig. 1 shows only by way of example a structure having a part adapted to be controlled with the apparatus of the invention. The greater part of the structure of Fig. 1 is included only for the sake of providing a complete disclosure and does not form part of the present invention.

Fig. 1 shows in a transverse section part of a grinding machine which includes a stationary frame 1 having longitudinally extending guide ways which support a carriage 2, diagrammatically shown in Fig. 1, for movement back and forth longitudinally of the machine in a direction normal to the plane of Fig. 1. The front side face of the carriage 2, which is the left side face thereof as viewed in Fig. 1, adjustably carries in a known way control blocks which may be positioned anywhere along the carriage 2 to actuate control levers or the like when the carriage 2 has moved to a given position on the frame 1.

A stationary frame portion 3 is carried by the frame 1 and extends freely over the carriage 2 to define with frame 1 an opening through which the carriage 2 freely passes. This frame 3 guides a second carriage 4 for movement forwardly and rearwardly in a direction transverse to movement of carriage 2 (to the right and left, as viewed in Fig. 1), and this carriage 4 carries a grinding tool 6 which is turnable on any suitable support and which is rotated in any suitable way such as by the belt 5 and a suitable pulley.

In order to shift the carriage 4 transversely of the machine, the frame 1 includes a stationary portion 7 which turnably supports a partly threaded spindle 8 for rotation about its axis, this spindle being located directly over a cylinder 18 fixed to the rear face of portion 7 of the frame 1 and having a flat top face which is horizontal. A nut 9 is in threaded engagement with the threaded portion of spindle 8 and has a bottom flat face slidably engaging the top flat face of cylinder 18 so that the nut 9 cannot turn, and a tubular extension 10 is fixed to the nut 9 and also has a bottom flat face slidably engaging the top flat face of the cylinder 18, the bore of extension 10 accommodating the free end of spindle 8 during movement of elements 9 and 10 axially with respect to the spindle 8. As is evident from Fig. 1, suitable thrust bearings are provided to turnably support the spindle 8 while restraining the same against axial shifting movement, and a disc 17 is fixed to the spindle 8 for turning movement therewith. A hand wheel 15 is freely turnable with respect to disc 17 and may be releasably fixed thereto in any desired angular position of the hand wheel 15 by a set screw 16 extending threadedly through hand wheel 15 and abutting against disc 17, so that when the hand wheel 15 is thus fixed to disc 17, elements 15-17 may be manually rotated to turn the spindle 8 and axially shift elements 9 and 10.

The extension 10 is pivotally connected to one end of a link 11 whose opposite end is pivotally connected to the longer arm of a bifurcated lever 12 having two parallel side pieces spaced from each other, only one of these side pieces being shown in Fig. 1. The lever 12 is turnably carried by a pivot pin 27, and the upper end of lever 12 is turnably connected to one end of a link 13 whose opposite end is pivotally connected directly to the rear end of the carriage 4. A spring 14 extends into a bore of carriage 3 and abuts against the latter and against the front end of the carriage 4, spring 14 being a compression spring and urging carriage 4 to the left with respect to support 3, as viewed in Fig. 1, so as to eliminate play from the linkage 11–13.

A piston 19 is slidable within the cylinder 18 from the end position shown in Fig. 1, where the piston 19 engages a stop member, to the right, as viewed in Fig. 1, and the piston 19 is fixed to a piston rod 20 which extends through a suitable sealing gland outwardly beyond the cylinder 18. The free end of piston rod 20 is pivotally connected to one end of a link 21 whose opposite end is pivotally connected to the bottom end of a lever 22 which is turnably supported at its top end by a pivot pin fixedly carried by the machine. A link 23 is pivotally connected at one end to the lever 22 intermediate the ends thereof, and the opposite end of link 23 is pivotally connected to the bottom end of a lever 24 which is keyed by a key 26 to the pivot pin 27 to turn the same, the top end of lever 24 being connected to one end of a tension spring 25 whose opposite end is connected to the support 3, so that this tension spring eliminates play from the linkage 21–24.

The pivot pin 27 has an elongated central portion carrying levers 12 and 24, and the ends of the pivot pin 27 are eccentrically located with respect to this central portion thereof and are turnably in suitable, coaxial, stationary bearings of the machine. It will be noted that the lever 24 is located between the two side pieces of the lever 12. With the disclosed arrangement, manual turning of spindle 8 causes the lever 12 to turn freely on pivot pin 27 to shift the carriage 4 without in any way transmitting any movement to elements 18–25. On the other hand, when the piston 19 is moved in cylinder 18, the central portion of pivot pin 27 turns about the common axis of its eccentric end portions, and as a result the lever 12 is turned about its bottom end which is pivotally connected to the link 11 so as to shift the carriage 4 in this way.

Figure 2:
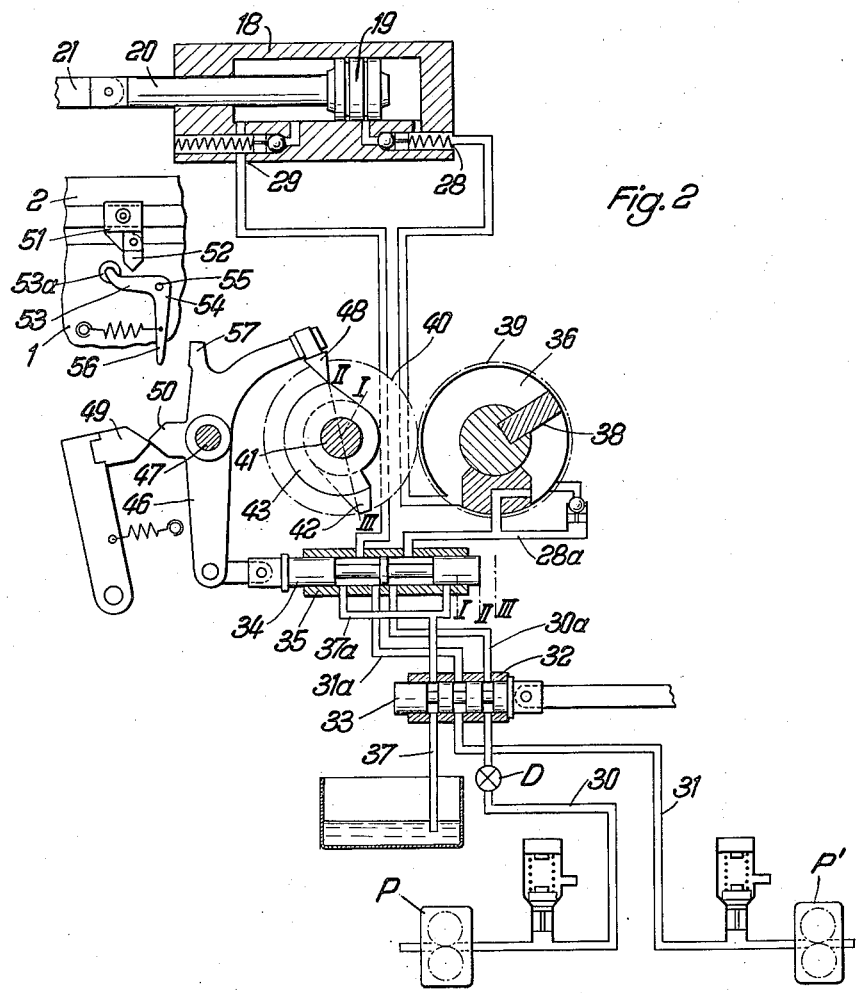
Fig. 2 is a schematic, partly sectional illustration of the control apparatus of the invention shown operatively connected to a part of the machine of Fig. 1.
Figure 3:
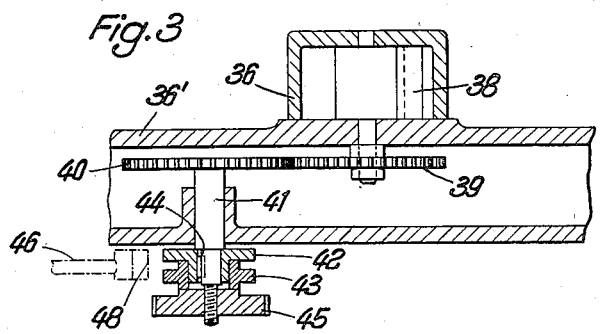
Fig. 3 is a fragmentary partly sectional and partly diagrammatic view showing details of the structure for connecting a hydraulic motor of the invention to a mechanical means for controlling to valve which in turn controls the hydraulic motor.

The present invention relates to the control means for regulating the flow of fluid to and from the cylinder 18, and the structure of the present invention is illustrated in Figs. 2 and 3. As is evident from Fig. 2, conduits 28 and 29 communicate with opposite ends, respectively, of the cylinder 18 which is shown in a reversed position, with respect to Fig. 1, for the sake of convenience. The conduit 28 communicates with the interior of a hydraulic motor 36 which includes a stationary cylinder in which a blade-type piston 38 is located for turning movement about the axis of this cylinder. A stop shown in section in Fig. 2 in the lower portion of the hydraulic motor 36 limits turning movement of the piston 38 to an angle of approximately 240°, in the particular example illustrated. A conduit 28a provides communication between the hydraulic motor 36 and the housing 35 of a multi-way valve 34, 35 which includes a slide valve member 34 slidable within the tubular housing 35 to the right and left, as viewed in Fig. 2. Any suitable stationary supports are provided to carry the hydraulic motor 36 and the valve 34, 35. It will be noted that valve member 34 has central and end portions of a larger diameter than the parts of valve member 34 interconnecting these central and end portions so that the valve member 34 is provided with a pair of fairly wide annular grooves axially separated by the central enlarged portion of the valve member 34, only these enlarged portions of valve member 34 slidably engaging the inner face of the tubular housing 35. Another conduit 29 communicates with the end of cylinder 18 opposite from the end communicating with conduit 28, and this conduit 29 leads directly to the housing 35 at a point spaced axially from the connection between housing 35 and conduit 28a, in the manner shown in Fig. 2. Of course, conduits 29 and 28a communicate with the interior of housing 35.

As is best shown in Fig. 3, a shaft is fixed to the piston 38 for turning movement therewith and extends outwardly beyond the end wall 36' of the motor 36. A gear 39 is fixed to this shaft for turning movement therewith and meshes with a gear 40 which is fixed to a shaft 41 whose axis is parallel to the turning axis of piston 38. The shaft 41 is supported for turning movement about its axis by a bearing in the lower horizontal wall shown in section in Fig. 3, and the shaft 41 has a cam 42 fixed thereto by a key 44 for rotation therewith. The cam 42 has a cylindrical extension on which a second cam 43 is freely turnable, and the shaft 41 has a threaded portion carrying a knurled nut 45 which abuts against an end face of the cam 43 to fix the latter to cam 42 for rotation with the same and with the shaft 41. Thus, it is possible to adjust the cam 43 angularly with respect to the cam 42 by loosening the nut 45, and after such angular adjustment the cam 43 may be maintained in its adjusted position by tightening the nut 45 against the cam 43.

The configuration of cam 43 is shown clearly in Fig. 2, and the cam 42 is in the form of a projection extending from a hub through which the shaft 41 extends, this projection extending outwardly beyond the periphery of cam 43, as shown in Fig. 2. The periphery of cam 43 has a larger radius through approximately 180° than through the remainder of cam 43, and, as is evident from Fig. 2, the peripheral portion of cam 43 which has the smallest radius is of the same radius as the hub of cam 42.

A lever 46 is turnable on a pin 47 which is fixed to a stationary member (not shown), and this lever 46 is linked at its lower end, as viewed in Fig. 2, to the left end of the slide valve member 34, and it will be noted that this left end of valve member 34 has a collar fixed thereon which limits the movement of valve member 34 to the right, as viewed in Fig. 2, this limit being provided by engagement between the collar and the left end face of stationary housing 35 as viewed in Fig. 2. The upper end of the lever 46 carries a knife edge 48 which engages the cams 42 and 43. As is evident from Fig. 3, the knife edge 48 is wide enough to bridge cams 42 and 43 and simultaneously engage the same. Adjacent to the pivot pin 47, the lever 46 carries a member 50 having a left end portion of V-shaped cross section cooperating with a member 49 having a right end portion of V-shaped cross section which engages the left end portion of member 50, as shown in Fig. 2. The member 49 is carried by a lever which is turnably supported adjacent its bottom end, as viewed in Fig. 2, by a stationary pivot pin, and a spring is connected at one end to this lever and at its opposite end to a stationary member to urge this lever and member 49 in a clockwise direction, as viewed in Fig. 2, toward the lever 46. It is evident that members 49 and 50 form a snap-over structure which operates in a manner similar to a toggle linkage. With the position of the parts shown in Fig. 2, the member 49 will urge lever 46 in a clockwise direction about pin 47 so as to maintain knife edge 48 in engagement with the cams. However, as soon as the left edge of member 50 moves over and passes below the right edge of member 49, as viewed in Fig. 2, the member 49 will urge the lever 46 in a counterclockwise direction about pin 47, as viewed in Fig. 2, and will thus maintain the knife edge 48 out of engagement with cams for a purpose described below.

A substantially U-shaped conduit 37a communicates with spaced portions of housing 35, as shown in Fig. 2, and with a discharge conduit 37 which leads directly to a reservoir for the hydraulic fluid. Furthermore, conduits 30a and 31a communicate with the interior of housing 35 in the manner shown in Fig. 2 and lead from the latter to a tubular housing 32 which communicates also with the discharge conduit 37a, discharge conduit 37 leading from the housing 32 to the reservoir. A slide valve 33 is axially slidable within the stationary housing 32 and has three annular grooves respectively communicating with conduits 37a, 31a, and 30a, in the position shown in Fig. 2, the valve member 33 being shiftable to the right, by any suitable device not forming part of the present invention, such as a linkage and a block fixed in a desired position on the front face of carriage 2, in order to stop the operation of the apparatus. The conduits 30a and 31a communicate through the housing 32 and valve member 33, when the latter is in a position shown in Fig. 2, respectively with conduits 30 and 31 which respectively are supplied with fluid under pressure by the pumps P and P', these pumps having their suction lines in communication with any suitable source of fluid such as the reservoir to which the line 37 discharges. A manually operable valve D is located in the line leading from pump P to housing 32 in order to throttle the flow of fluid through conduit 30 to a desired extent so as to regulate the pressure of the fluid delivered by the pump P to the cylinder 18.

The above described structure operates as follows:

Assuming that all spaces within the cylinders and conduits are filled with oil, at the start of a cycle of operations the piston 38 is in its end position where it extends downwardly to the right, as viewed in Fig. 2, the piston 19 is at the right end of cylinder 18, as viewed in Fig. 2 (the left end of cylinder 18, as viewed in Fig. 1), and the slide valve 34 is located to the left of the position shown in Fig. 2 with the right end of slide valve 34 located at position I. It will be noted that in this position of the parts, because of the cooperation between gears 39 and 40, the cams 42 and 43 are angularly displaced in a counterclockwise direction, as viewed in Fig. 2, and the knife edge 48 is located along the circle I which has the smallest diameter and which coincides with the hub of the cam 42. The slide valve 33 remains in the position shown in Fig. 2 during all of the operations of the disclosed structure, this slide valve being shifted only to completely stop the operations, as was pointed out above.

With the parts in the above-described starting position, the hydraulic fluid will flow from both of the pumps P and P' along the lines 30 and 31 through the valves 32, 33 and along the lines 30a and 31a into the valve housing 35. In position I of slide valve member 34, both of the lines 30a and 31a communicate with the line 28a, and the top right end of the discharge line 37a is closed by the enlarged right end portion of valve member 34, as viewed in Fig. 2, while the top left end of discharge lines 37a, as viewed in Fig. 2 is opened, is separated from lines 31a and 30a by the enlarged central portion of slide valve 34, and communicates with the line 29. Thus, with this position of the parts fluid will be supplied from both pumps to the blade-type piston 38 which thus turns in a counterclockwise direction, as viewed in Fig. 2, and displaces the hydraulic fluid along the line 28 into the right end of cylinder 18, as viewed in Fig. 2, so as to advance the piston 19 to the left, as viewed in Fig. 2, the hydraulic fluid flowing out of cylinder 18 along the conduit 29 and through discharge lines 37a and 37 back to the reservoir. Because both pumps are delivering fluid to the hydraulic motor 36, the movement of piston 19 is rapid at this time, and the rate of movement of the piston 19 may be regulated by the valve D.

As the piston 38 of the hydraulic motor turns in a counterclockwise direction, as viewed in Fig. 2, the gear 39 turns therewith and turns the gear 40 and the cams 42 and 43 therewith in a clockwise direction, as viewed in Fig. 2, so that the peripheral portion of cam 43 which has the largest radius moves into engagement with the knife edge 48 and turns the lever 46 in a counterclockwise direction about pivot pin 47, as viewed in Fig. 2, so as to shift slide valve member 34 to the right, as viewed in Fig. 2, until it reaches position II, the parts being illustrated in this position in Fig. 2. Thus, at this time the knife edge 48 engages only the cam 43 which continues to turn in a clockwise direction, as viewed in Fig. 2, and it is evident from Fig. 2 that once position II is attained by slide valve 34 and lever 46, these parts will remain in this position while the piston 38 and the cams 42 and 43 turn through approximately 180°, piston 38 continuing to turn at this time in a counterclockwise direction, as viewed in Fig. 2. As is evident from Fig. 2, the central enlarged portion of slide valve 34 is located in the illustrated position of parts between lines 31a and 30a so that the line 31a communicates directly with the discharge line 37a, and thus the pump P' no longer supplies fluid to the hydraulic motor 36. This motor is now driven only by the pump P and the valve D controls the rate of supply of fluid to the hydraulic motor, so that the piston 19 continues to move to the left, as viewed in Fig. 2 (or to the right, as viewed in Fig. 1), at a slower rate. The fast rate of movement of piston 19 when the parts are in position I may be used to quickly advance a tool, such as a grinding wheel, up to the work while the slower feed provided by the parts when they are in position II, illustrated in Fig. 2, may be used to feed the tool into the work during the actual cutting, for example.

When the piston 38 has almost reached its opposite end position where it extends downwardly to the left, as viewed in Fig. 2, the cam 43 will have turned through a distance sufficient to bring the outwardly projecting portion of cam 42 into engagement with the knife edge 48 and the piston 19 will have almost reached its left end position, as viewed in Fig. 2. At this time the cam 42 turns the lever 46 further in a counterclockwise direction, as viewed in Fig. 2, so as to shift the slide valve member 34 further to the right, as viewed in Fig. 2, and once the left edge of member 50 has passed downwardly over the right edge of member 49, as viewed in Fig. 2, the latter under the influence of the spring connected thereto will resiliently urge the lever 46 in a counterclockwise direction so that the knife edge 48 will not move inwardly toward the shaft 41. The parts are now in position III where the right end of slide valve 34 is located at the dot-dash line III of Fig. 2, where the knife edge 48 is located along the circle III, and where the collar at the left end of slide valve member 34 engages the left end face of tubular housing 35, as viewed in Fig. 2. When the parts reach position III the pistons 38 and 19 have reached the end of their stroke.

In this position of the parts the enlarged right end of valve member 34 has uncovered the top right end of discharge line 37a, as viewed in Fig. 2, and the top left end of this discharge line is closed by the enlarged left end of valve member 34. Moreover, the enlarged central portion of valve member 34 has shifted to the right, so that both of the pumps now communicate with the left annular groove of valve member 34, and thus both pumps supply fluid to the conduit 29 which feeds the fluid into the left end of the cylinder 18 to shift the piston 19 to the right, as viewed in Fig. 2, and the piston 19 now displaces fluid out of cylinder 18 and along the conduit 28 to the motor 36 to drive the piston 38 in a clockwise direction, as viewed in Fig. 2, the piston 38 now displacing fluid through conduit 28a to the discharge lines 37a and 37. The turning of piston 38 in a clockwise direction produces a counterclockwise turning of the cams 42 and 43, as viewed in Fig. 2, so that all of the parts return toward position I, with the exception of lever 46 and slide valve 34 which are retained in position III by the snap-over mechanism 49, 50. When the pistons 19 and 38 have almost reached their starting position, a block 51 on the carriage 2, pivotally carrying a dog 52 with bevelled end, actuates to depress one arm 53 provided with a roller 53a on its free end of a bell crank 54 turnably carried by a pin 55 fixed to a stationary portion of frame 1. The other arm 56 of bell crank 54 has a free end located adjacent an upwardly extending abutment 57 of lever 46, when the latter is in position III, and a spring is connected at one end to the arm 56 and at its opposite end to a stationary portion of frame 1 to urge bell crank 54 in a clockwise direction, as viewed in Fig. 2, and its other arm 53 with roller 53a on its free end into the path of dog 52. The engagement of the dog 52 with the bell crank 54 turns the latter in that direction which causes the arm 56 to engage the abutment 57 of lever 46 and turn the latter in a clockwise direction, as viewed in Fig. 2 until the snap-over mechanism itself urges the lever 46 in the clockwise direction. The block 51 is adjusted on the carriage 2 in accordance with the desired operations with its dog 52, in a way similar as a pawl, operating during movement together with block 51 on carriage 2 in one direction only (to the right as viewed in Fig. 2), to depress the arm 53 of bell crank 54 upon contact of its right bevelled end face with roller 53a on the free end of said arm. When moving in the opposite direction, the dog 52 swings upward as soon as its left bevelled end face contacts roller 53a and continues its movement (to the left as viewed in Fig. 2) without any action on bell crank 54. To accomplish this object, the upper end portion of dog 52 above its pivot is substantially circular shaped leaving one edge on the upper left corner to abut against block 51 on the inside as soon as the right bevelled end face strikes roller 53a.

It should be noted that the adjustability of the cam 43 enables the cycle of operations to be changed as desired. Furthermore it should be noted that the piston 38, when it is in its end positions, does not actually engage the stop shown in section in the lower portion of the hydraulic motor 36 in Fig. 2. In other words if the piston 38 turned from a position engaging one side of the stop to a position engaging the other side of the stop, it would displace a volume greater than that which can be displaced by the piston 19 in the cylinder 18. With this arrangement it is evident that the movement of the piston 19 to its end positions in cylinder 18 is assured since the piston 38 still tends to displace fluid into cylinder 18 when the piston 19 has reached its left end position, as viewed in Fig. 2, and since the piston 19 when it moves to the right, as viewed in Fig. 2, can displace into the hydraulic motor a volume greater than that displaced when the piston 19 reaches its right end position, as viewed in Fig. 2. Also, it will be seen that all positions of piston 19 and cams 42 and 43 correspond respectively to particular positions of piston 38, so that precision of operation is assured.

Figure 2A:
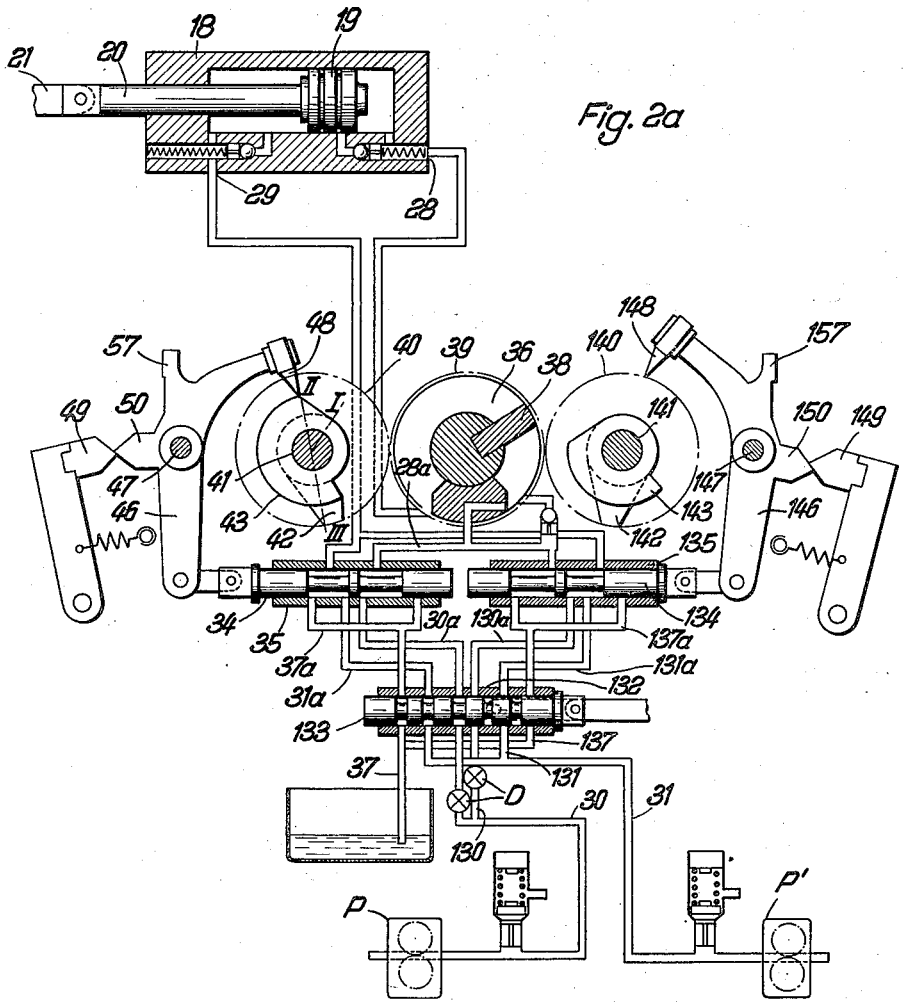
Fig. 2a is a schematic illustration of a modification of the control apparatus of Fig. 2.

Instead of the above described snap-over mechanism, other control devices, such as solenoids and the like, may be used to actuate the lever 46. Furthermore, the shaft fixed to piston 38 and extending outwardly of the hydraulic motor may be extended to cooperate with additional control devices similar to that disclosed in Fig. 2 so that the single motor 36 may be used to operate a plurality of control devices. For example, the disclosed arrangement may be used to control the rough grinding operation of a grinding machine while an identical arrangement with different settings of the cams may be used to control the polish or finish grinding operations, as represented in Fig. 2a. The individual parts of the last named control device are identical with those of the other control device for the rough grinding and perform the same functional operations, they have corresponding reference numerals in addition to number one hundred. The housing 132 and valve member 133, however, are common to both devices and represent a symmetric duplication of valves 32, 33. A suitable control is provided to simultaneously shift valve member 133 in housing 132 so as to stop operation of one control apparatus when the other is operating and vice versa.

It will be understood that each of the elements described above, or two or more together, may also find a useful application in other types of control apparatus differing from the types described above.

While the invention has been illustrated and described as embodied in hydraulic and mechanical control apparatus for machine tools and the like, it is not intended to be limited to the details shown, since various modifications and structural changes may be made without departing in any way from the spirit of the present invention.

Without further analysis, the foregoing will so fully reveal the gist of the present invention that others can by applying current konwledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Control apparatus comprising, in combination, hydraulic moving means for moving a given member; a multiway valve hydraulically connected to said hydraulic moving means for controlling the flow of fluid to and from the same; a hydraulic motor hydraulically connected to said valve and hydraulic moving means, said hydraulic motor including a cylinder, a blade-type piston turnable in said cylinder about the axis thereof, and a first shaft fixed to said piston for turning movement therewith and extending outwardly beyond said cylinder; a second shaft; means supporting said second shaft for rotation about its axis; cam means carried by said second shaft for rotation therewith; gear means connected to said first and second shafts for transmitting turning movement of said first shaft to said second shaft; and mechanical control means operatively connected to said valve for operating the same and operatively connected to said cam means to be operated thereby.

2. Control apparatus comprising, in combination, hydraulic moving means for moving a given member; a multiway valve hydraulically connected to said hydraulic moving means for controlling the flow of fluid to and from the same; a hydraulic motor hydraulically connected to said valve and hydraulic moving means, said hydraulic motor including a cylinder, a blade-type piston turnable in said cylinder about the axis thereof, and a first shaft fixed to said piston for turning movement therewith and extending outwardly beyond said cylinder; a second shaft; means supporting said second shaft for rotation about its axis; cam means carried by said second shaft for rotation therewith, said cam means including at least one cam turnable with respect to said second shaft and a means for adjustably fixing said one cam on said second shaft in a given angular position with respect thereto; gear means connected to said first and second shafts for transmitting turning movement of said first shaft to said second shaft; and mechanical control means operatively connected to said valve for operating the same and operatively connected to said cam means to be operated thereby.

3. Control apparatus comprising, in combination a cylinder; a piston movable in said cylinder and adapted to be connected to an element to be moved; a hydraulic motor; a first conduit communicating with said hydraulic motor and with one end of said cylinder for conveying fluid from said motor to said cylinder to shift said piston in one direction in said cylinder when said hydraulic motor operates in a first direction; a second conduit communicating with the opposite end of said cylinder for conveying fluid therefrom when said piston moves in said one direction and for conveying fluid to said cylinder for shifting said piston in a direction opposite said one direction to convey fluid through said first conduit back to said motor to operate the same in a second direction opposite from said first direction; a pair of pumps; a discharge conduit; valve means connected hydraulically to said discharge conduit, said pumps, said second conduit, and said hydraulic motor and having a first position providing communication between both of said pumps and said hydraulic motor and between said second conduit and said discharge conduit for quickly advancing said piston in said one direction in said cylinder, having a second position providing communication between only one of said pumps and said hydraulic motor and between said second conduit and discharge conduit for slowly advancing said piston in said one direction, and having a third position providing communication between both of said pumps and said second conduit and between said motor and discharge conduit for quickly advancing said piston in said opposite direction; and mechanical control means operatively connected to said hydraulic motor to be operated thereby and to said valve means for moving the same between said first, second, and third positions thereof.

4. Control apparatus comprising, in combination, a cylinder; a piston movable in said cylinder and adapted to be connected to an element to be moved; a hydraulic motor; a first conduit communicating with said hydraulic motor and with one end of said cylinder for conveying fluid from said motor to said cylinder to shift said piston in one direction in said cylinder when said hydraulic motor operates in a first direction; a second conduit communicating with the opposite end of said cylinder for conveying fluid therefrom when said piston moves in said one direction and for conveying fluid to said cylinder for shifting said piston in a direction opposite said one direction to convey fluid through said first conduit back to said motor to operate the same in a second direction opposite from said first direction; a pair of pumps; a discharge conduit; valve means connected hydraulically to said discharge conduit, said pumps, said second conduit, and said hydraulic motor and having a first position providing communication between both of said pumps and said hydraulic motor and between said second conduit and said discharge conduit for quickly advancing said piston in said one direction in said cylinder, having a second position providing communication between only one of said pumps and said hydraulic motor and between said second conduit and discharge conduit for slowly advancing said piston in said one direction, and having a third position providing communication between both of said pumps and said second conduit and between said motor and discharge conduit for quickly advancing said piston in said opposite direction; and mechanical control means operatively connected to said hydraulic motor to be operated thereby and to said valve means for moving the same between said first, second, and third positions thereof; and second valve means operatively connected to the hydraulic connection between said one pump and said first-mentioned valve means for controlling the pressure of the fluid supplied by said one pump so as to regulate the speed of movement of said piston.

5. In a control apparatus, in combination, a hydraulic motor including a cylinder, a blade-type piston turnable in said cylinder about the axis thereof, and a first shaft fixed to said piston for turning movement therewith and extending outwardly beyond said cylinder; a second shaft; means supporting said second shaft for turning movement about its axis; gear means interconnecting said first and second shafts for transmitting movement of said motor to said second shaft; valve means hydraulically connected to said hydraulic motor and having a first position leading fluid to said motor and a second position leading fluid from said motor; lever means operatively connected to said valve means for operating the same; and cam means carried by said second shaft for turning movement therewith and engaging said lever means for actuating the latter to operate said valve means.

6. In a control apparatus, in combination, a hydraulic motor including a cylinder, a blade-type piston turnable in said cylinder about the axis thereof, and a first shaft fixed to said piston for turning movement therewith and extending outwardly beyond said cylinder; a second shaft; means supporting said second shaft for turning movement about its axis; gear means interconnecting said first and second shafts for transmitting movement of said motor to said second shaft; valve means hydraulically connected to said hydraulic motor and having a first position leading fluid to said motor and a second position leading fluid from said motor; lever means operatively connected to said valve means for operating the same; cam means carried by said second shaft for turning movement therewith and engaging said lever means for actuating the latter to operate said valve means; and means engaging said lever means for maintaining the same in engagement with said cam means when said valve means is in said first position thereof and for maintaining said lever means out of engagement with said cam means when said valve means is in said second position thereof.

7. Apparatus for automatically controlling operations of a machine tool such as cross-feed of a grinding machine or the like, comprising, in combination, a hydraulic system including a cylinder, a working piston reciprocable in said cylinder, a source of pressure fluid, conduit means interconnecting said source of pressure fluid and said cylinder for circulation of fluid in said system, and hydraulically operable means located in said conduit means intermediate said cylinder and said source of pressure fluid for cyclically operating said piston; said conduit means including a pair of pipe means for cyclically feeding and discharging fluid to and from said cylinder and said hydraulically operable means, and said hydraulically operable means being located in one of said pair of pipe means, slide valve means interconnected in said conduit means intermediate said source of fluid on one hand, and said hydraulically operable means and said cylinder on the other hand, and connected to permit feed and discharge of fluid through each of said pipe means cyclically during reciprocation of said piston; and mechanical control means connected to and operated by said hydraulically operable means for controlling said slide valve means in such a manner that said piston is reciprocated with selective speed variation during its cyclical reciprocation.

8. Apparatus as set forth in claim 7 including at least one additional mechanical control means connected to and operated by said hydraulically operable means;

9. Apparatus as set forth in claim 7 wherein each said mechanical control means includes at least one pair of cams and said hydraulically operable means includes a turnable vane-type piston having a shaft connected to drive said edge cams.

10. Apparatus as set forth in claim 9 including gear transmission means operatively interconnecting said hydraulically operable means with said mechanical control means.

11. Apparatus as set forth in claim 10 including a shaft supporting said pair of cams, and detachable means for adjustably fixing said cams on said shaft in various turned positions.

12. Apparatus as set forth in claim 11 wherein the volume of fluid displaced by the vane-type piston in its turning movement is greater than the volume of fluid displaced from the cylinder by said first-mentioned reciprocable working piston over the entire length of its infeed movement.

13. Apparatus as set forth in claim 12 including at least one additional mechanical control means connected to and operated by said hydraulically operable means.

14. Apparatus as set forth in claim 15, including a shaft supporting said pair of cams, and detachable means for adjustably fixing said cams on said shaft in various turned positions.

15. Apparatus as set forth in claim 9 wherein the volume of fluid displaced by the vane-type piston in its turning movement is greater than the volume of fluid displaced from the cylinder by said working piston over the entire length of its infeed movement.

16. Control apparatus comprising, in combination, hydraulic moving means for moving a given member; a multiway valve hydraulically connected to said hydraulic moving means for controlling the flow of fluid to and from the same; a hydraulic motor hydraulically connected to said valve and hydraulic moving means, said hydraulic motor including a cylinder, a blade-type piston turnable in said cylinder about the axis thereof; a rotatable member fixed to said piston for turning movement therewith and extending outwardly beyond said cylinder; turnable means; transmission means connecting said rotatable member and said turnable means for turning said turnable means with said piston; actuating means connected to said turnable means for rotation therewith; and mechanical control means operatively connected to said actuating means to be operated thereby and operatively connected to said valve for operating the same whereby flow of fluid to and from said hydraulic moving means is controlled.

17. Control apparatus comprising, in combination, hydraulic moving means for moving a given member; a multiway valve hydraulically connected to said hydraulic moving means for controlling the flow of fluid to and from the same; a hydraulic motor hydraulically connected to said valve and hydraulic moving means, said hydraulic motor including turnable hydraulic operating means; a rotatable member fixed to said operating means for turning movement therewith; turnable means; transmission means connecting said rotatable member and said turnable means for turning said turnable means with said operating means, actuating means connected to said turnable means for rotation therewith; and mechanical control means operatively connected to said actuating means to be operated thereby and operatively connected to said valve for operating the same whereby flow of fluid to and from said hydraulic moving means is controlled.

18. Control apparatus comprising, in combination, hydraulic moving means for moving a given member; a multiway valve hydraulically connected to said hydraulic moving means for controlling the flow of fluid to and from the same; a hydraulic motor hydraulically connected to said valve and hydraulic moving means, said hydraulic motor including movable hydraulic operating means; turnable means; transmission means connecting said operating means and said turnable means for turning said turnable means during movement of said operating means; cam means connected to said turnable means for rotation therewith; and mechanical control means operatively connected to said cam means to be operated thereby and operatively connected to said valve for operating the same whereby flow of fluid to and from said hydraulic moving means is controlled.

19. Control apparatus comprising, in combination, hydraulic moving means for moving a given member; a multiway valve hydraulically connected to said hydraulic moving means for controlling the flow of fluid to and from the same; a hydraulic motor hydraulically connected to said valve and hydraulic moving means, said hydraulic motor including a cylinder, hydraulic operating means turnable in said cylinder about the axis thereof, and a first shaft fixed to said hydraulic operating means for turning movement therewith and extending outwardly beyond said cylinder; a second shaft; means supporting said second shaft for rotation about its axis; cam means carried by said second shaft for rotation therewith; gear means connected to said first and second shafts for transmitting turning movement of said first shaft to said second shaft; and mechanical control means operatively connected to said valve for operating the same and operatively connected to said cam means to be operated thereby.

References Cited in the file of this patent

UNITED STATES PATENTS

| 1,848,006 | Ferris | Mar. 1, 1932 |
| 2,105,473 | Dean | Jan. 18, 1938 |
| 2,261,444 | Neubert | Nov. 4, 1941 |
| 2,524,055 | Hubert | Oct. 3, 1950 |

FOREIGN PATENTS

| 154,542 | Australia | Dec. 16, 1953 |